(12) United States Patent
Bae et al.

(10) Patent No.: US 11,822,765 B2
(45) Date of Patent: Nov. 21, 2023

(54) METHOD FOR MANAGING ITEM LIST AND AN APPARATUS FOR THE SAME

(71) Applicant: Coupang Corp., Seoul (KR)

(72) Inventors: Jee Hyun Bae, Seoul (KR); Seung Hee Kang, Seoul (KR); Young Ju Choi, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/394,781

(22) Filed: Aug. 5, 2021

(65) Prior Publication Data
US 2022/0350448 A1 Nov. 3, 2022

(30) Foreign Application Priority Data

Apr. 30, 2021 (KR) .................. 10-2021-0056456

(51) Int. Cl.
*G06F 3/0482* (2013.01)
*G06F 3/04817* (2022.01)
*G06Q 30/0601* (2023.01)
*G06F 3/0483* (2013.01)

(52) U.S. Cl.
CPC .......... *G06F 3/0482* (2013.01); *G06F 3/0483* (2013.01); *G06F 3/04817* (2013.01); *G06Q 30/0633* (2013.01); *G06Q 30/0643* (2013.01)

(58) Field of Classification Search
CPC .. G06F 3/04817; G06F 3/0482; G06F 3/0483; G06Q 30/0633; G06Q 30/0643
See application file for complete search history.

(56) References Cited

U.S. PATENT DOCUMENTS

| | | | | |
|---|---|---|---|---|
| 5,970,471 A | * | 10/1999 | Hill | G06Q 30/02 705/26.8 |
| 6,104,398 A | * | 8/2000 | Cox, Jr. | G06F 3/04847 715/821 |
| 7,792,709 B1 | * | 9/2010 | Trandal | G06Q 30/0601 705/26.1 |
| 9,189,811 B1 | * | 11/2015 | Bhosle | G06Q 30/0641 |
| 9,710,835 B2 | | 7/2017 | Ochiai | |
| 2002/0143660 A1 | * | 10/2002 | Himmel | G06Q 30/0633 705/26.8 |

(Continued)

FOREIGN PATENT DOCUMENTS

| | | |
|---|---|---|
| JP | 2019164706 A | 9/2019 |
| KR | 1020090036024 A | 4/2009 |

(Continued)

OTHER PUBLICATIONS

"System and Method for 'Wish List' Actualization and Use," IBM, retrieved from IP.com, Jul. 24, 2003. (Year: 2003).*

*Primary Examiner* — Eric J. Bycer
(74) *Attorney, Agent, or Firm* — Banner & Witcoff, Ltd.

(57) ABSTRACT

Disclosed is an item list management method comprising checking a first list including at least one item selected according to a selection input of a user, checking a first sub-list and a second sub-list in which the at least one item is classified based on a time when the at least one item is stored in the first list, and providing, in response to a first input of the user related to the first list, a first page including the first sub-list displayed in a first area and the second sub-list displayed in a second area distinct from the first area.

22 Claims, 11 Drawing Sheets

(56) References Cited

U.S. PATENT DOCUMENTS

| | | | | |
|---|---|---|---|---|
| 2003/0172005 A1* | 9/2003 | Hellal | | G06F 16/438 |
| | | | | 705/14.51 |
| 2005/0021417 A1* | 1/2005 | Kassan | | G06Q 30/06 |
| | | | | 705/14.51 |
| 2005/0283573 A1* | 12/2005 | Mewhinney | | G06F 12/123 |
| | | | | 711/E12.071 |
| 2007/0174257 A1* | 7/2007 | Howard | | G06F 16/338 |
| 2008/0033952 A1* | 2/2008 | McKenney | | G06F 16/9024 |
| 2008/0040240 A1* | 2/2008 | Covington | | G06Q 30/0633 |
| | | | | 705/26.8 |
| 2008/0046343 A1* | 2/2008 | Maguire | | G06Q 30/0633 |
| | | | | 705/26.62 |
| 2008/0065460 A1* | 3/2008 | Raynor | | G06Q 10/1097 |
| | | | | 705/7.15 |
| 2008/0113658 A1 | 5/2008 | Bloebaum et al. | | |
| 2008/0195523 A1* | 8/2008 | Rabenold | | G06Q 40/04 |
| | | | | 705/37 |
| 2009/0063299 A1* | 3/2009 | Amacker | | G06Q 30/0643 |
| | | | | 705/26.64 |
| 2010/0030624 A1* | 2/2010 | Vanska | | G06Q 30/0639 |
| | | | | 705/14.64 |
| 2010/0131377 A1* | 5/2010 | Karnalkar | | G06Q 30/0601 |
| | | | | 705/14.1 |
| 2011/0126123 A1* | 5/2011 | Reter | | G06Q 10/109 |
| | | | | 715/751 |
| 2011/0296290 A1* | 12/2011 | Ruthfield | | G06F 16/9558 |
| | | | | 715/206 |
| 2012/0265637 A1* | 10/2012 | Moeggenberg | | G06Q 30/02 |
| | | | | 705/26.8 |
| 2012/0303480 A1* | 11/2012 | Stone | | G06Q 30/00 |
| | | | | 705/26.8 |
| 2013/0066740 A1* | 3/2013 | Ouimet | | G06Q 30/02 |
| | | | | 705/26.7 |
| 2013/0117149 A1* | 5/2013 | Gupta | | G06Q 30/06 |
| | | | | 705/26.8 |
| 2014/0201031 A1 | 7/2014 | Brooks | | |
| 2016/0050168 A1* | 2/2016 | Zutphen | | H04L 51/24 |
| | | | | 715/752 |
| 2016/0210674 A1* | 7/2016 | Allen | | G06Q 30/0635 |
| 2016/0379175 A1* | 12/2016 | Bhattacharya | | G06Q 10/1097 |
| | | | | 705/7.21 |
| 2018/0005305 A1* | 1/2018 | Hirsch | | G06Q 30/0625 |
| 2018/0150191 A1* | 5/2018 | Lin-Hendel | | G06F 40/14 |
| 2018/0268468 A1* | 9/2018 | Levy | | G06Q 30/0603 |
| 2019/0187864 A1* | 6/2019 | Yeh | | G06F 3/0482 |

FOREIGN PATENT DOCUMENTS

| | | |
|---|---|---|
| KR | 1020140144258 A | 12/2014 |
| KR | 101695570 B1 | 1/2017 |
| KR | 1020200007215 A | 1/2020 |
| KR | 102138306 B1 | 7/2020 |
| KR | 102147649 B1 | 8/2020 |
| KR | 102155012 B1 | 9/2020 |
| WO | 2009048219 A1 | 4/2009 |

\* cited by examiner

METHOD FOR MANAGING ITEM LIST AND AN APPARATUS FOR THE SAME

RELATED APPLICATION INFORMATION

The present application claims priority to and the benefit of Korean Patent Application No. 10-2021-0056456 filed on Apr. 30, 2021, and is incorporated by reference herein in its entirety.

TECHNICAL FIELD

Example embodiments of the present disclosure relate to a method and an apparatus for managing item list, and more specifically, to a method and an apparatus for managing item list for effectively organizing items that a user wants to purchase, items that a user wanted to purchase but have been left unattended for a long period of time, and so on.

DESCRIPTION OF THE RELATED ART

In an internet shopping mall, a user can select a desired item and purchase the selected item. In addition, the internet shopping mall provides a function to temporarily store an item selected by a user.

Prior document: Korean Patent Registration 10-2147649

If the items selected by the user are simply stored in the item list temporarily, items for which the user later gave up their intention to purchase may continue to be left in the item list. In this case, the item list includes both the items the user wants to purchase and the items the user does not want to purchase any more without being organized. If items are left unorganized in the item list in this way, it may confuse the user and weaken the user's willingness to purchase the item, and the burden of organizing the neglected items is transferred to the user.

DISCLOSURE OF THE INVENTION

Technical Goals

An aspect of the present disclosure is to provide a method and an apparatus for managing item list capable of solving the above issues. Specifically, if items that the user wants to purchase and items that the user does not want to purchase are left unorganized, it may confuse the user and weaken the user's willingness to purchase the item, and the burden of organizing the neglected items is transferred to the user.

The technical aspects of the present disclosure are not limited to those mentioned above, and other aspects can be inferred from the following example embodiments.

Technical Solutions

According to an aspect, there is provided an item list management method of an electronic apparatus, the method including at least one of checking a first list including at least one item selected according to a selection input of a user, checking a first sub-list and a second sub-list in which the at least one item is classified based on a time when the at least one item is stored in the first list, and providing, in response to a first input of the user related to the first list, a first page including the first sub-list displayed in a first area and the second sub-list displayed in a second area distinct from the first area.

The first sub-list according to example embodiments may include a first image corresponding to an item included in the first sub-list, the second sub-list may include a second image corresponding to an item included in the second sub-list, and the first image may be displayed larger than the second image in the first page.

Moreover, the first page may include information related to a purchase condition based on an item included in the first sub-list displayed in a third area distinct from the first area.

Moreover, the second sub-list may include a first interface corresponding to each item included in the second sub-list. In addition, according to an input of the user corresponding to the first interface, the item related to the first interface may be moved to the first sub-list.

Furthermore, a specific item may be included in the first sub-list when selected according to the selection input of the user, and the specific item may be moved from the first sub-list to the second sub-list when a period in which the specific item is stored in the first sub-list is longer than a specific period.

In addition, the first area may be located above the second area in the first page according to example embodiments, and the first area may be displayed at a position that can be exposed without scrolling on a terminal of the user. Also, the first area may be larger than the second area.

Furthermore, the item list management method may further comprise checking a display order of an item in the first sub-list. In addition, the display order of the item may be determined based on a number of attempts to purchase the item and a period in which the item is stored in the first sub-list.

Furthermore, the item list management method may further comprise providing a second page for managing the at least one item included in the first sub-list and the second sub-list.

In addition, the second page may display the at least one item based on a period in which the at least one item is stored in the first sub-list. Also, the second page may include a check box for the user to select whether or not to delete the item from the first sub-list.

According to example embodiments, when the item is stored in the first sub-list for a specific period or longer, the check box for the item in the second page may be displayed with checked as a default.

Furthermore, the first sub-list according to example embodiments may include a second icon corresponding to each item included in the first sub-list, and, according to an input of the user corresponding to the second icon, the item related to the second icon may be moved from the first sub-list to the third sub-list.

In addition, the item list management method may further comprise providing a third page for managing the at least one item included in the third sub-list, the third page may include a fourth area for displaying the third sub-list, the second sub-list may include a third icon corresponding to each item included in the second sub-list, and, according to an input of the user corresponding to the third icon, the item related to the third icon may be moved to the first sub-list.

Furthermore, the first area according to example embodiments may display items in the first sub-list sorted by category. In addition, the first area may display, according to an input of the user corresponding to a specific category, an item corresponding to the specific category in the first sub-list.

Furthermore, the second sub-list according to example embodiments may include a fifth area displaying information on a first item included in the second sub-list, and the fifth area may include a fourth icon for moving the first item to the first sub-list based on an input based on a gesture of the user.

Effects

An item list management method according to example embodiments may allow users to conveniently distinguish between an item to be purchased and an item not to be purchased.

An item list management method according to example embodiments provides an effect that the user can easily organize items that the user does not want to purchase while promoting the purchase intention by displaying items that the user intends to purchase in a conspicuous manner.

An item list management method according to example embodiments enables users to efficiently organize the first sub-list so that users do not purchase items that users cannot purchase (i.e., items that are out of stock and cannot be purchased).

DETAILED DESCRIPTION FOR CARRYING OUT THE INVENTION

Figure 1:
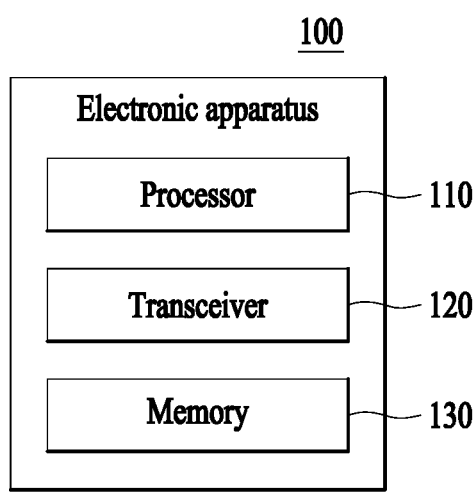
FIG. 1 illustrates examples of internal components of an electronic apparatus according to example embodiments.

Hereinafter, example embodiments of the present disclosure are described in detail with reference to the accompanying drawings.

Detailed descriptions of technical specifications well-known in the art and unrelated directly to the present disclosure may be omitted to avoid obscuring the subject matter of the present disclosure. This aims to omit unnecessary description so as to make clear the subject matter of the present disclosure.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers Advantages and features of the present disclosure and methods of accomplishing the same may be understood more readily by reference to the following detailed description of example embodiments and the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 illustrates examples of internal components of an electronic apparatus according to example embodiments.

Referring to FIG. 1, internal components of an electronic apparatus 100 are not limited to those illustrated. The electronic apparatus 100 may include at least one of a processor 110, a transceiver 120, and a memory 130.

The processor 110 may process a series of operations for performing an item list management method according to various example embodiments of the present disclosure. The processor 110 may control other components of the electronic apparatus. Meanwhile, in an example embodiment, a product may be used as a term referring to a specific item, and the item may be sold to a user in a service related to the electronic apparatus 100.

The processor 110 may check detailed information about a first item in response to a request of a first page for the first item. When the processor 110 checks through the memory 130 whether the first item is included in a specific category, the processor 110 may identify at least one second item corresponding to the specific category. The processor 110 may check at least one attribute list corresponding to the specific category, and the attribute list may be previously stored in the memory 130 or may be received from the outside through the transceiver 120. The processor 110 may provide the first page to a display of the electronic apparatus 100. The first page may include a first part in which detailed information about the first item is provided, a second part in which first attribute information of the first item corresponding to the attribute list is provided, and a third part in which second attribute information of at least one second item corresponding to the attribute list is provided.

The transceiver 120 may perform functions of transmitting information stored in the memory 130 of the electronic apparatus 100 or information processed by the processor 110 to another apparatus or receiving information from another apparatus to the electronic apparatus 100.

The memory 130 is a data structure implemented in a predetermined storage space of the electronic apparatus 100, and functions such as storing, searching, deleting, editing, or adding data may be freely performed. For example, the memory 130 may have fields or elements for processing functions such as storing, searching, deleting, editing, or adding data. The memory 130 may store data related to performing information providing method by the electronic apparatus 100. For example, the memory 130 may store instructions or data for an execution operation of the processor 110.

The memory 130 according to example embodiments may include a database for storing information on items and so on.

The electronic apparatus 100 according to example embodiments may perform an item list management method according to example embodiments described below. The electronic apparatus 100 may be referred to, for example, an item list management apparatus.

In addition, an interface described in this specification may be variously interpreted as a configuration of hardware for receiving an input signal from a user, or an icon, widget, button, slide bar, progress bar, touch area, etc. implemented in software.

Figure 2:
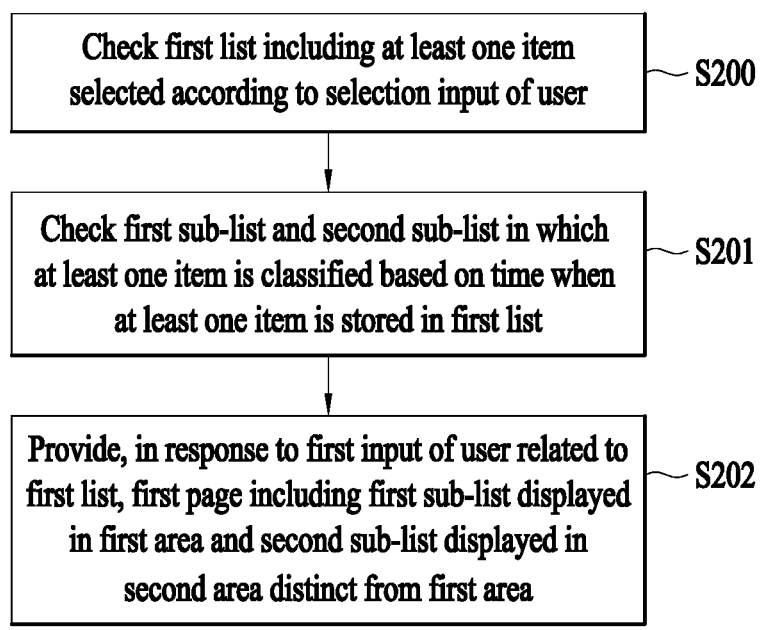
FIG. 2 is a flowchart illustrating a method of managing an item list according to example embodiments.

FIG. 2 is a flowchart illustrating an item list management method according to example embodiments.

In the item list management method according to example embodiments, an electronic apparatus may perform at least one of operations S200, S201, and S202 shown in FIG. 2.

In operation S200, in the item list management method according to example embodiments, the electronic apparatus may check a first list including at least one item selected according to a selection input of a user.

The first list may include, for example, a list for temporarily storing items that the user wants to purchase. For example, the user may search for items to be purchased through a terminal apparatus of the user and temporarily store the items to purchase. The user may then purchase one or more temporarily stored items. Accordingly, the first list may mean a list of one or more items configured to temporarily store items that the user wants to purchase. The list temporarily stored as described above may include, for example, a cart list, and through the cart list, the user can collectively purchase items checked on different pages.

The selection input may be confirmed through an input signal received from the terminal apparatus of the user in order to check the items included in the first list according to example embodiments. Based on the first input, the electronic apparatus according to example embodiments may provide the user with items included in the first list and information on the items.

In operation S201, a first sub-list and a second sub-list in which at least one item is classified based on time when the at least one item is stored in the first list may be checked.

If the user searches for the item he/she wants to purchase and stores the item he/she wants to purchase in the first list continuously, items for which the user later gave up their intention to purchase may continue to be included in the item list. As a result, the first list includes both the items the user wants to purchase and the items the user does not want to purchase any more without being organized. If the first list is left unorganized in this way, it may confuse the user and weaken the user's willingness to purchase the item. Also, the items in the first list are neglected, the burden of organizing the neglected items is transferred to the user.

Accordingly, the electronic apparatus according to example embodiments may check the first sub-list including items added by the user to the first list for purchase among the item(s) included in the first list, and the second sub-list for storing items that are unlikely to be purchased, have been added to the list for a long time, or need to be sorted out. The first sub-list can be variously called such as a purchase list, a shopping cart list, or a cart list, and the second sub-list can be variously called such as a separate list, a separate management list, a hidden list, a parted list, or a neglected items list. Meanwhile, the first sub-list and the second sub-list may be displayed together on the page for disclosing the first list, and the user may collectively purchase the items included in the first sub-list. However, as described in the following example embodiments, items included in the second sub-list may be moved to the first sub-list, or items included in the second sub-list may also be selected and collectively purchased. However, by allowing the items included in the first sub-list to be selected as defaults on the page that discloses the first list, the electronic apparatus allows the user to easily distinguish and purchase only the items included in the first sub-list other than the items that are less likely to be purchased by the user. Meanwhile, when an input for selecting all items included in the list is received on the page disclosing the first list, the items included in the first sub-list are collectively selected, and the items included in the second sub-list are excluded from the selection. In order to select the items included in the second sub-list, an input corresponding to the second sub-list may be performed, or an operation of moving the item included in the second sub-list to the first sub-list may be performed.

In the present specification, the 'sub-list' is described as if it is included in the 'list'. However, the two concepts may not necessarily have an inclusive relationship, and they may not be used to distinguish between large and small numbers of included items. That is, 'sub-list' can be interpreted as an example of 'list'. In other words, the first sub-list or the second sub-list should not be interpreted as being limited to the list included in the above-described first list.

In the item list management method according to example embodiments, the electronic apparatus may check the items included in the first list, and include all or some of the items in the first sub-list (shopping cart list). The electronic apparatus according to example embodiments may check the items included in the first list, and may classify or move into the second sub-list or delete items that need to be organized among them. In addition, the electronic apparatus according to example embodiments may inquire to the user whether to include items that need to be organized in the second sub-list.

For example, in the item list management method according to example embodiments, the electronic apparatus may check a period stored in the first list for each item in the first list, and when the stored period elapses a specific period (stored for more than a period of time), the corresponding item can be moved to the second sub-list. For example, the electronic apparatus according to example embodiments may check items included in the first list for which a specific period has elapsed since they were included in the shopping cart.

Here, the stored period may be a period elapsed from the time it was first added to the first list, but in another example embodiment, it may be a period from the date it was last added to the first list to the present. For example, if the user added the first item to the first list on March 1, deleted it on April 1, and then added it again on May 1, the stored period may mean the elapsed time from May 1 to the present.

The specific period may be, for example, at least one of 30 days, 60 days, 90 days, and 180 days. It may be set to various periods in addition to the above-described examples, and may be set by the user. In addition, the specific period may be preset for each item or may be set by the user for each item. According to an example, a specific period may be set differently according to the characteristics of the item. In addition, when the attribute of an item indicates that it is an item purchased a lot during a specific season or a specific period, the item may be automatically moved to the second sub-list when a period of high purchase has elapsed. Also, in an example embodiment, when it is confirmed that an item included in the first sub-item list is no longer sold in a service related to the electronic apparatus or it is difficult to secure stock for a long period of time, the item is moved to the second sub-item list regardless of the stored period, and the corresponding item may be displayed on the second sub-item list.

That is, in operation S201, the electronic apparatus according to example embodiments may identify items to be moved to the second sub-list among the items in the first list, and move the identified items to the second sub-list.

In operation S202, the electronic apparatus according to example embodiments may provide a first page including the first sub-list displayed in a first area and the second sub-list displayed in a second area distinct from the first area in response to a first input of the user related to the first list.

The first page according to example embodiments is a page for displaying items in the first list (some or all of the items in the first list). The first page may be referred to as a shopping cart page, a cart page, or the like. The first page is a page provided to the user based on the user's first input.

The first page according to example embodiments may display items included in the first sub-list and the second sub-list. For example, it may include the first area displaying the first sub-list and the second area displaying the second sub-list. Also, according to example embodiments, the first area may be located above (over) the second area. Also, according to example embodiments, the first area may be displayed at a position that can be exposed without scrolling in the user terminal. A position that can be exposed without scrolling may be variously determined on the first page, and the first area may be displayed at a fixed position regardless of a user's scroll input. The first area may include, for example, the first area 301 of FIG. 3. The second area may include, for example, the second area 302 of FIG. 3.

Furthermore, the first sub-list (or the first area) according to example embodiments may include a first image corresponding to an item included in the first sub-list. Similarly, the second sub-list (or the second area) may include a second image corresponding to an item included in the second sub-list. Here, on the first page, the first image may be displayed larger than the second image.

According to example embodiments, the first area in the first page includes a first sub-list item area displaying information on each item in the first sub-list. Further, the second area in the first page includes a second sub-list item area displaying information on each item in the second sub-list. Here, the first sub-list item area may be displayed larger than the second sub-list item area.

For example, the items included in the first sub-list are items that the user has recently added to the first list, and may be the items that the user is likely to purchase. Accordingly, the first sub-list induces purchase of the items that the user is willing to purchase by displaying it on the first page so that it is more conspicuous to the user than the second sub-list, and at the same time, it is possible to efficiently manage items that the user does not intend to purchase separately.

According to example embodiments, the user may move an item included in the second sub-list of the first page to the first sub-list. In the first page according to example embodiments, the second sub-list may include a first interface corresponding to each item included in the second sub-list. Here, according to a user input corresponding to the first interface, the item related to the first interface may be moved from the second sub-list to the first sub-list. Through the first interface, for example, an input for moving a specific item included in the second sub-list to the shopping cart sub-list (the first sub-list) according to example embodiments may be identified. The first interface may be the first interface 302b of FIG. 3.

The first page according to example embodiments may include information related to a purchase condition based on an item included in the first sub-list displayed in a third area distinct from the first area. The information related to the purchase condition may include, for example, information on discounts applied when purchasing items related to a specific item, information indicating benefits that can be applied when purchasing other items in the same category as a specific item, or information indicating how much other items in the same category as a specific item must be purchased to be able to purchase. The information related to the purchase condition may be displayed in the form of text, but may be displayed in the form of a progress bar in which a progress status is displayed according to the selected item.

The item list management method according to example embodiments performed by the electronic apparatus according to example embodiments may further include checking a display order of items in the first sub-list (shopping cart sub-list).

The item list management method performed by the electronic apparatus according to example embodiments may include providing items in the first sub-list (shopping cart sub-list) to the user in a specific order. For example, the electronic apparatus according to example embodiments may configure the first page such that the item determined to be highly likely to be purchased by the user among the items in the first sub-list is positioned at a higher level in the first page and the item determined to be unlikely to be purchased by the user is positioned at a lower level in the first page. The item determined to be highly likely to be purchased by the user may include, for example, an item that the user has recently added to the first sub-list or the first list. In addition, the item determined to be unlikely to be purchased by the user may include, for example, an item that has been added to the first sub-list or the first list by the user for a specific period of time or more, or an item included in the second sub-list.

For example, the item list management method performed by the electronic apparatus according to example embodiments may further include generating or checking information (priority information, etc.) indicating a display order of items in the first sub-list. The item list management method according to example embodiments may check the abovementioned priority information and show the items in the first sub-list to the user based on the order according to the checked priority information. The display order of the items according to example embodiments may be determined based on the number of times the user attempts to purchase each item and a period in which each item is included (or stored) in the first sub-list according to example embodiments.

For example, when the number of times the user attempts to purchase the first item is frequent, the electronic apparatus according to example embodiments may determine the purchase possibility of the first item to be high and assign a high priority to the first item, and display the first item to be exposed at a higher level of the first area of the first page. For example, when a long period of time has elapsed since the second item has been included in the first list and the number of purchase attempts by the user is small, the electronic apparatus according to example embodiments determines that the purchase possibility of the second item is low and assign a low priority, and the second item may be displayed to be exposed at a lower level the first area of the first page (or to be located in an area that can be displayed through scroll).

The electronic apparatus according to example embodiments provides the effect of promoting purchase intention by prominently displaying the item the user wants to purchase due to this operation or configuration, and at the same time, the user can easily organize the item that the user does not want to purchase.

The item list management method according to example embodiments performed by the electronic apparatus according to example embodiments may further include providing a second page for managing at least one item included in the first sub-list and the second sub-list.

Figure 3:
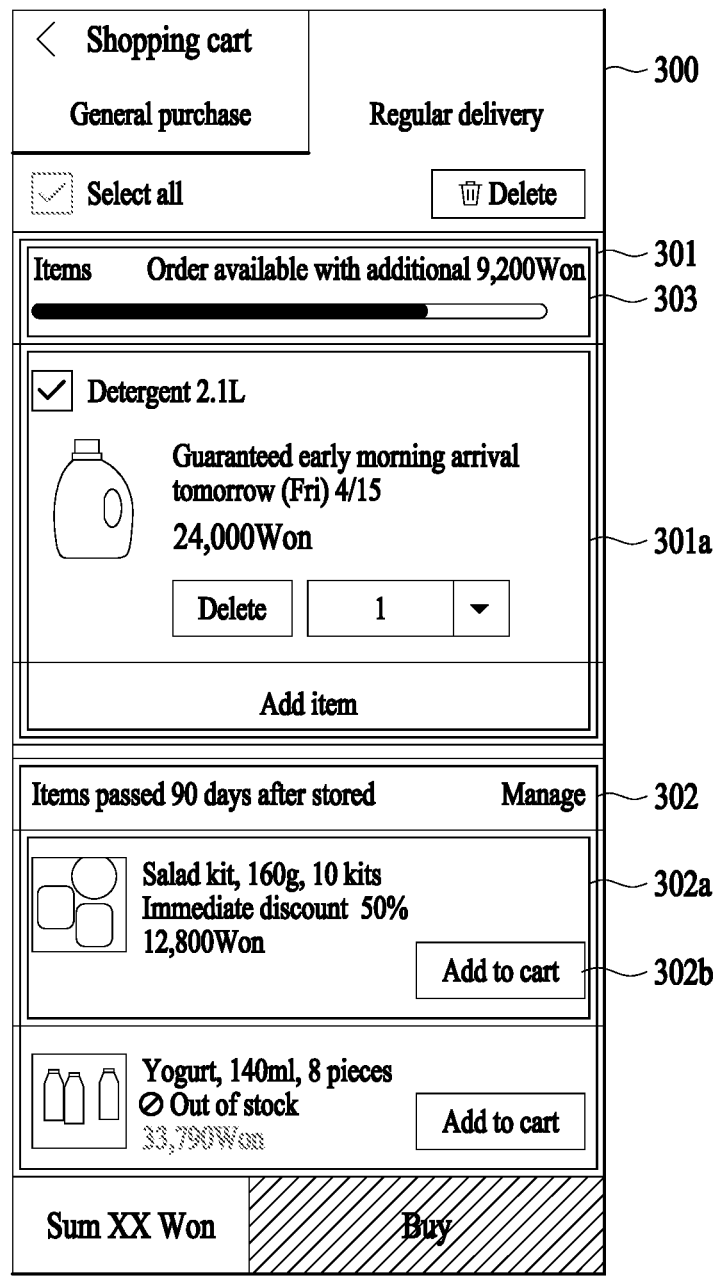
FIG. 3 illustrates an example of a page representing a first sub-list and a second sub-list according to example embodiments.

FIG. 3 illustrates an example of a page representing a first sub-list and a second sub-list according to example embodiments.

FIG. 3 is an example of a first page 300 according to example embodiments. The first page 300 shown in FIG. 3 may be, for example, the first page described in FIG. 2. The first page may be called variously, such as a shopping cart page.

The first page 300 includes information on one or more items included in the first sub-list and the second sub-list according to example embodiments. The first page 300 may classify the one or more items into a general purchase type item and a regular delivery type item and provide them to users. The first page 300 may further include a check box for selecting all of the one or more items included in the first sub-list and the second sub-list, and a second delete interface for deleting the selected item from the first sub-list or the second sub-list. The first page 300 may include a third purchase interface for purchasing the selected item.

The first page 300 may include a shopping cart item area (first area) 301 displaying items in the first sub-list (shopping cart sub-list) according to example embodiments, and a second sub-list item area (second area) 302 displaying items in the second sub-list.

The first page 300 may include a third area 303 including information related to purchase conditions based on the items included in the first sub-list. The third area 303 may be included in the first area 301 or may be a different area separated from the first area.

The first area 301 includes an area displaying all or some of the item(s) in the first sub-list. That is, the first area 301 may display information on all items in the first sub-list or information on only some item(s).

The first area 301 may include, for each item in the first sub-list, an item description area 301a displaying information on the item. The item description area 301a includes an image or video representing the item, name of the item, expected delivery or arrival date of the item, and price of the item. The item description area 301a may further include a second interface for deleting the corresponding item from the first sub-list and a fourth interface for setting a purchase quantity of the corresponding item. The first area 301 may further include a fifth interface for moving to a page for adding the item to the first sub-list.

The second area 302 may include, for each item in the second sub-list, an item description area 302a displaying information on the item. The item description area 302a may include an image or video representing the corresponding item, name of the item, price of the item, and the like.

The item description area 302a may include a first interface 302b for including the corresponding item in the first sub-list again. When the user clicks on the first interface 302b of the item description area 302a, the electronic apparatus according to example embodiments may include the corresponding item in the first sub-list again, and the information about the item can be displayed in the first area 301 in the first page.

As another example, the first interface 302b may be configured to be displayed in the item description area 302a based on a specific gesture of the user. For example, when the user transmits an input signal based on a specific gesture in the item description area 302a, the electronic apparatus according to example embodiments may display the first interface 302b in the item description area 302a by the user. If the user clicks on the first interface 302b, the corresponding item is included in the first sub-list again.

The specific gesture may be, for example, a slide gesture or a gesture for magnification.

According to example embodiments, the item description area 301a included in the first area 301 in the first page may be displayed larger than the item description area 302a included in the second area 302. Also, according to example embodiments, the image/video of the item displayed in the item description area 301a included in the first area 301 can be larger than the image/video of the item displayed in the item description area 302a included in the second area 302. In addition, the information on the item displayed in the item description area 301a included in the first area 301 according to example embodiments can be more detailed than information on the item displayed in the item description area 302a included in the second area 302. For example, the height of the item description area 301a included in the first area 301 may be greater than the height of the item description area 302a included in the second area 302.

In the item list management method performed by the electronic apparatus according to example embodiments, by making a difference in the size of the item description area 301a included in the first area 301 and the size of the item description area 302a included in the second area 302, it is possible to effectively induce users to purchase items that they want to purchase and to organize items that they do not want to purchase anymore.

The first area 301a according to example embodiments may be located higher than the second area 302. Also, the first area 301 may be positioned to be displayed at a position that can be displayed without a scrolling of the user in the user's terminal in the first page 300.

In the item list management method performed by the electronic apparatus according to example embodiments, by making a difference in the arrangement and display positions of the first area 301 and the second area 302, it is possible to effectively induce users to purchase items that they want to purchase and to organize items that they do not want to purchase anymore.

Figure 4:
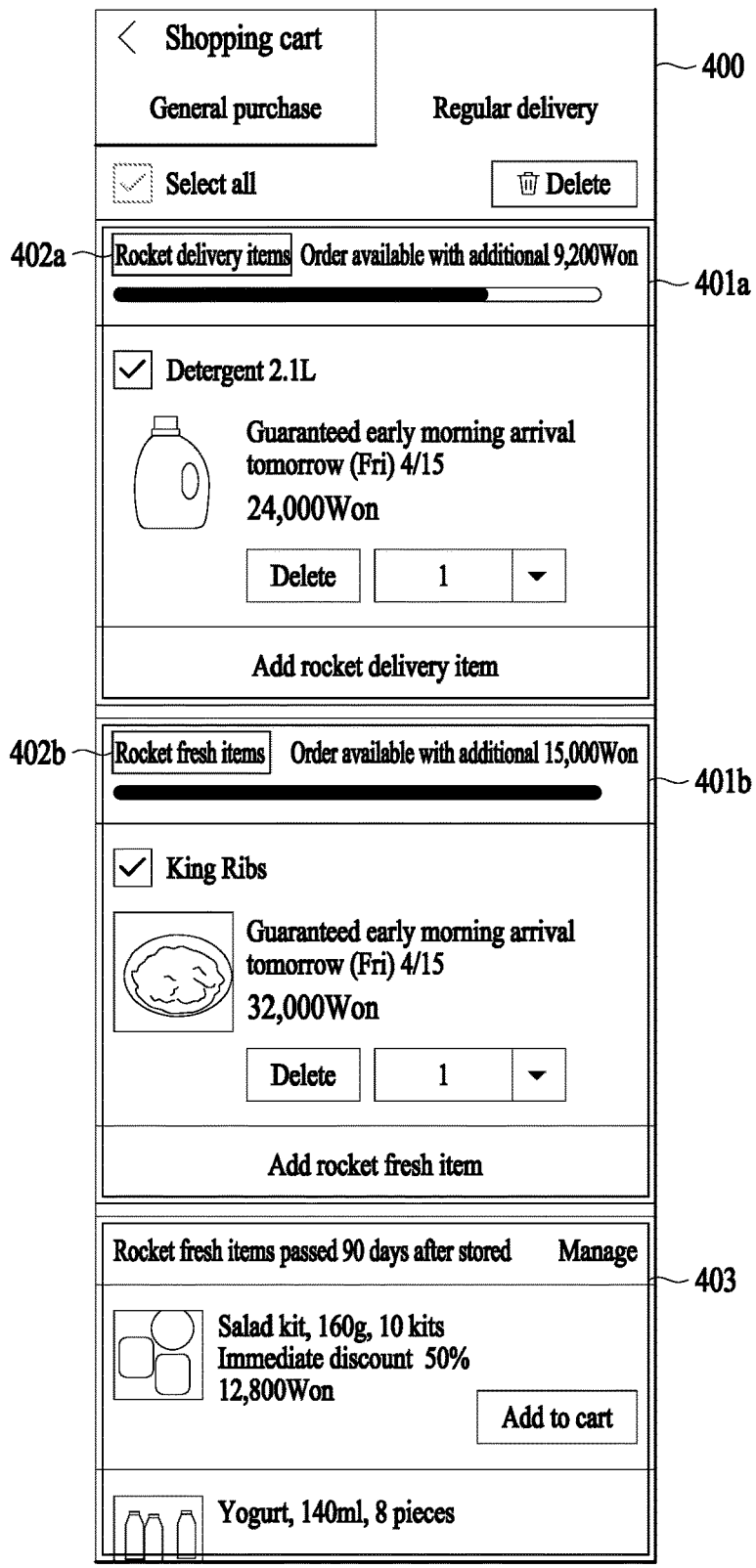
FIG. 4 illustrates an example of a page representing a first sub-list and a second sub-list according to example embodiments.

FIG. 4 illustrates an example of a page representing a first sub-list and a second sub-list according to example embodiments.

FIG. 4 is an example of a first page 400 according to example embodiments. The first page 300 shown in FIG. 4 may be, for example, the first page described with reference to FIGS. 2 to 3.

The item list management method performed by the electronic apparatus according to example embodiments may display the items on the first page so that they are all displayed in the first area according to example embodiments, without classifying and displaying the items by category as shown in FIG. 3. In addition, as shown in FIG. 4, the item list management method performed by the electronic apparatus according to example embodiments may classify and display the items included in the first sub-list or the second sub-list in a separate area or location for each category. Referring to FIG. 4, the electronic apparatus according to example embodiments may classify the items in the first sub-list by category, and the classified items for each category may be located and displayed in different areas 401a and 401b in the first page.

According to the item list management method performed by the electronic apparatus according to example embodiments, at least one of a fifth area 401a displaying item(s) corresponding to a first category in the first sub-list and a sixth area 401b displaying item(s) corresponding to a second category in the first sub-list may be included in the first area according to example embodiments. Furthermore, the item list management method according to example embodiments may include areas displaying item(s) corresponding to respective categories as much as the number of categories of the items.

The fifth area 401a and the sixth area 401b according to example embodiments may include item description areas representing information on the items for respective items (item description areas), as shown in FIG. 3.

The fifth area 401a and the sixth area 401b according to example embodiments may further include information 402a and 402b indicating categories of the corresponding areas, respectively.

Referring to FIG. 4, the item list management method performed by the electronic apparatus according to example embodiments may classify the items in the second sub-list by category to be positioned and displayed in different areas 403 in the first page. Meanwhile, the item list management method performed by the electronic apparatus according to example embodiments may display all items in the second sub-list in one area 403 without classifying them by category.

Figure 5:
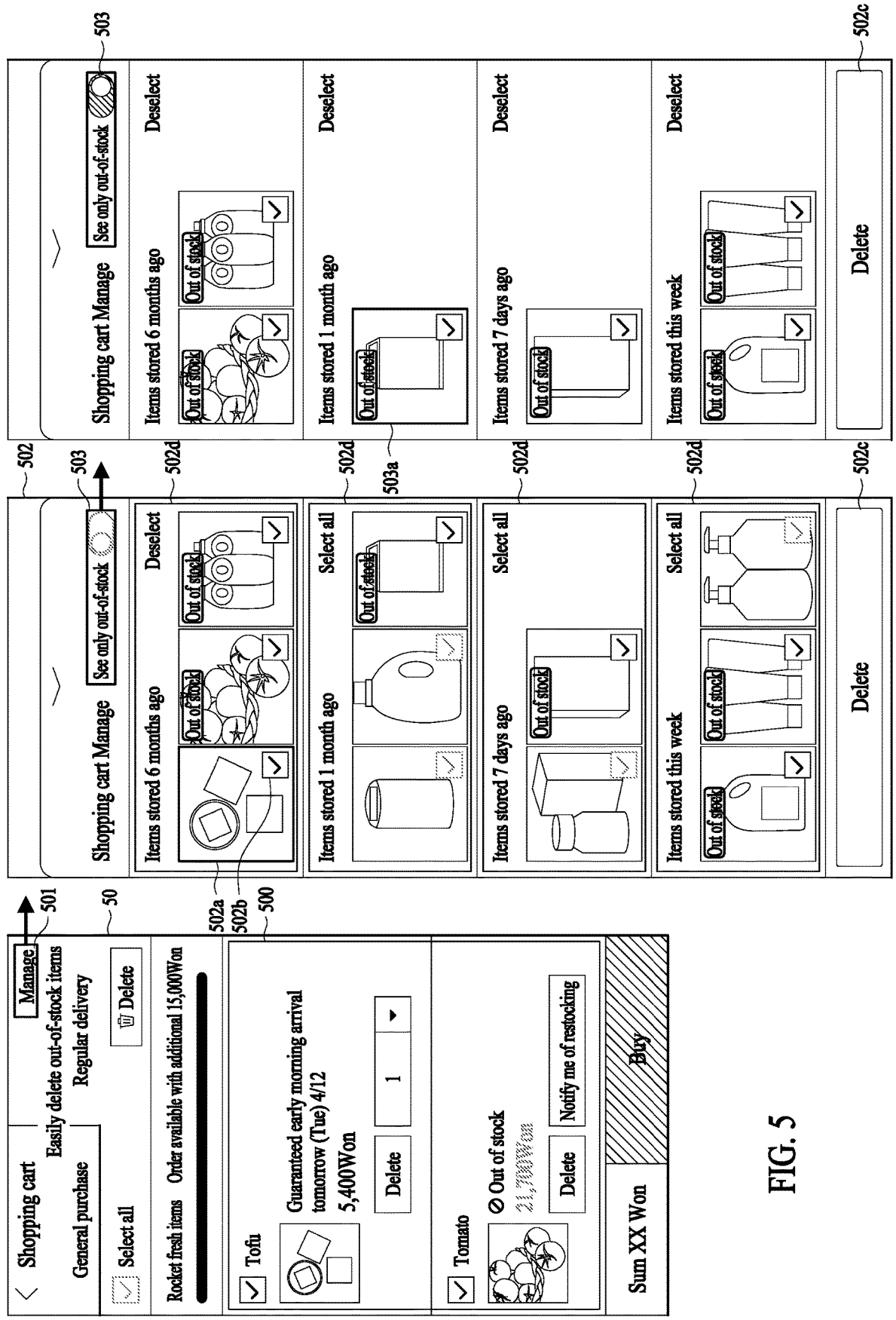
FIG. 5 shows an example embodiment for managing a first sub-list according to example embodiments.

FIG. 5 shows an example embodiment for managing a first sub-list according to example embodiments.

FIG. 5 shows a first page 50 according to example embodiments. The first page 50 according to example embodiments may include a first area 500 displaying item(s) included in the shopping cart list (first sub-list) according to example embodiments. The shopping cart list according to example embodiments may be the first sub-list or the first list described with reference to FIGS. 2 to 4.

The first page 50 according to example embodiments may further include a sixth interface 501 for moving to a second page for managing the first sub-list according to example embodiments. For example, when the user clicks on the sixth interface 501, the item list management method according to example embodiments may provide the user with the second page 502.

The second page may be a page for managing the first sub-list according to example embodiments. The second page may present item(s) included in the first sub-list according to example embodiments, and may include elements for the user to determine whether to delete each item from the first sub-list.

For example, the second page 502 may include at least one of an image or video 502a of the item(s) included in the first sub-list, a check box 502b for selecting whether to delete each item, and a seventh interface 502c for deleting the checked item(s).

For example, if the user selects one or more of the images or videos 502a of items or check boxes 502b for items on the second page and clicks on the seventh interface 502c, the item list management method according to example embodiments may delete item(s) selected by the user in the first sub-list.

The electronic apparatus according to example embodiments may classify items in the first sub-list according to a stored period in the first sub-list and display them on the second page 502. For example, the second page 502 may include one or more areas 502d, each area 502d including information about item(s) added to the first sub-list within a specific period. For example, the second page 502 may classify items in the first list to items added within 7 days prior to the current date, items added this week, items added 1 month ago, and items added 6 months ago, and display them in separate areas 502. Here, when calculating the item added to the first sub-list within a specific period, the time at which the item was added may be the time at which the item was last added as a reference.

Furthermore, the second page 502 may divide and display the areas 502d in the order of items stored for a long time in the first list. For example, the items added 6 months ago are displayed to be located at the top (upper side) on the second page 502, the items added 1 month ago are displayed below that, and then the items added 7 days ago, etc. may be displayed.

The electronic apparatus according to example embodiments may allow users to conveniently distinguish between items they want to purchase and items they do not want to purchase by using such a configuration or operation.

The second page 502 according to example embodiments may further include an eighth interface 503 for displaying only out-of-stock items among item(s) included in the shopping cart. The eighth interface 503 may be configured in the form of a switch configured to be turned on or off according to a user input.

When the eighth interface 503 according to example embodiments is set to display only out-of-stock items (e.g., when the switch is on), the second page according to example embodiments may display only the out-of-stock items 503a, and all check boxes 502b for the out-of-stock items may be displayed with checked as defaults. Accordingly, when the user sets the eighth interface 503 to display only the out-of-stock items and clicks on the seventh interface 502c with all the out-of-stock items checked, the electronic apparatus according to example embodiments may delete the out-of-stock items from the first sub-list.

The electronic apparatus according to example embodiments enables users to efficiently organize the first sub-list so that users do not purchase the items that users cannot purchase (i.e., items that are out of stock and cannot be purchased) due to this configuration.

The second page 502 according to example embodiments may be a separate page or may be a page displayed (or overlaid with) on the first page 50.

Figure 6:
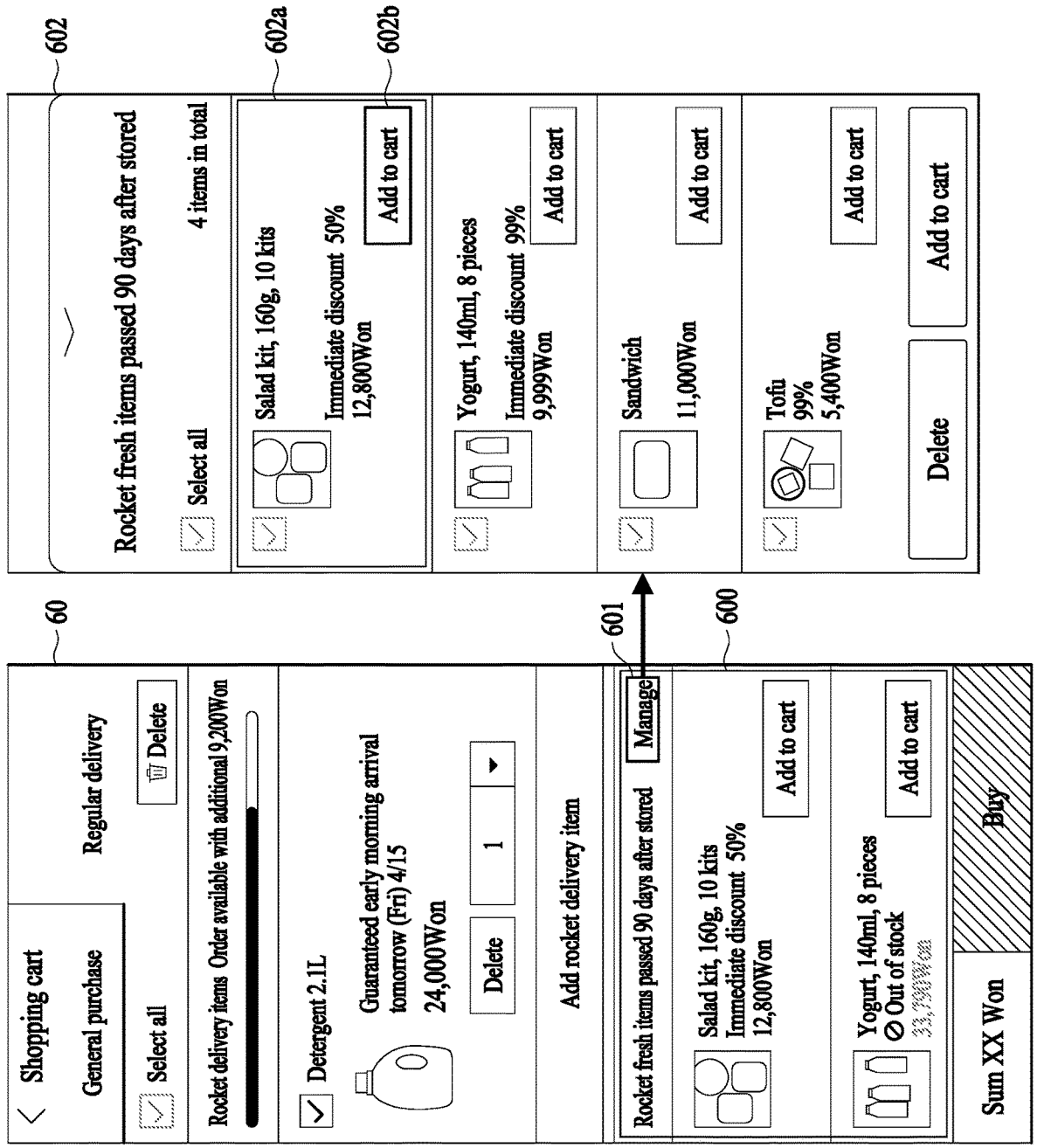
FIG. 6 shows an example embodiment for managing a second sub-list according to example embodiments.

FIG. 6 shows an example embodiment for managing a second sub-list according to example embodiments.

FIG. 6 illustrates a first page 60 according to example embodiments. The first page 60 according to example embodiments may include a second area 600 displaying item(s) included in the second sub-list according to example embodiments. The second area 600 may be the second areas 302 and 403 shown in FIGS. 3 to 5.

The second area 600 according to example embodiments may further include a ninth interface 601 for a management page for managing item(s) included in the second sub-list. For example, when the user clicks on the ninth interface 601, the electronic apparatus according to example embodiments may provide the user with the third page 602.

The third page 602 may be configured to, for example, select items to be moved to the first sub-list among the item(s) included in the second sub-list according to example embodiments. The third page 602 includes item(s) included in the second sub-list. The third page 602 may include an area 602a including information on each item included in the second sub-list, and an image or video of each item. The third page 602 may include, for each item, a tenth interface 602b for moving the corresponding item from the second sub-list back to the first sub-list. When the user clicks on the tenth interface 602b for a specific item, the electronic apparatus according to example embodiments may move the corresponding item from the second sub-list to the first sub-list.

The third page 602 may include a check box for selecting some or all of the item(s) included in the second sub-list, and may further include an interface for moving all checked items to the first sub-list and an interface for deleting from the second sub-list.

Figure 7:
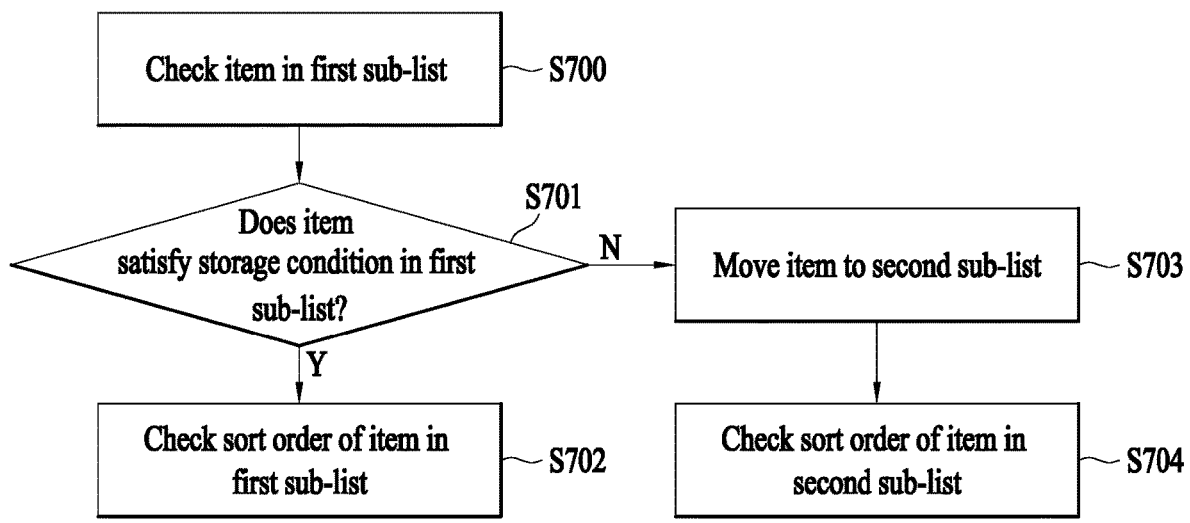
FIG. 7 illustrates an example of moving and sorting operations of items in a first sub-list and a second sub-list according to example embodiments.

FIG. 7 illustrates an example of moving and sorting operations of items in a first sub-list and a second sub-list according to example embodiments.

Some or all operations according to example embodiments shown in FIG. 7 may be performed in the item list management method and apparatus according to example embodiments. The electronic apparatus according to example embodiments may perform at least one of operation S700 of checking an item in the first sub-list and operation S701 of checking whether the item meets a storage condition in the first sub-list.

Operation S700 may include checking an item in the first sub-list. The first sub-list may include the first sub-list or the shopping cart list according to example embodiments described with reference to FIGS. 2 to 6.

Operation S701 may include checking whether a storage condition in the first sub-list of the item is satisfied. The storage condition in the first sub-list is a condition for the item to be continuously included in the first sub-list.

The storage condition in the first sub-list may include one or more detailed conditions. That is, the storage condition in the first sub-list may be a condition composed of a combination of one or more detailed conditions (for example, a condition that satisfies all of one or more detailed conditions, a condition that satisfies one of the one or more detailed conditions). The detailed conditions included in the storage condition in the first sub-list may be conditions set by a user, conditions set by a vendor, or conditions set in the item list management method according to example embodiments.

For example, the storage condition in the first list may include that the item is included in the first list within a specific period (30 days, 60 days, 90 days, 180 days, etc.) as described with reference to FIGS. 2 to 6. That is, when items included in the first list are included in the first sub-list for a specific period or longer, the electronic apparatus according to example embodiments may move the corresponding item from the first sub-list to another list (e.g., the second sub-list according to example embodiments).

For example, the storage condition in the first sub-list may include that the number of times the user attempts to purchase an item is less than or equal to a specific number of times. For example, with respect to the first item included in the first sub-list, there is a case that the number of times the user attempts to purchase but does not purchase the first item is greater than a specific number of times. In this case, the electronic apparatus according to example embodiments may determine that the probability that the user purchases the first item is not high, and may move the first item from the first sub-list to the second sub-list.

In operation S701, if a specific item satisfies the storage condition in the first sub-list, the electronic apparatus according to example embodiments performs operation S702 of checking a sort order (display order) of the item in the first sub-list.

In operation S702, the sort order of the item in the first sub-list may be checked. The electronic apparatus according to example embodiments checks the sort order of the corresponding item. The sort order of the corresponding item may mean a priority of the corresponding item. The priority of the corresponding item may be a degree of importance (priority) of the corresponding item among the item(s) in the first sub-list. The priority of the corresponding item may be determined according to, for example, how likely the user will purchase the corresponding item.

For example, when a first item in the first sub-list is recently included in the first sub-list and the number of purchase attempts by the user is small, the first item may be an item that the user may purchase soon. Accordingly, the electronic apparatus according to example embodiments may assign a high priority to the first item, and may prioritize the first item in the sort order.

On the other hand, if a second item in the first sub-list was included in the first sub-list a long time ago, and the number of purchase attempts by the user was large, but no purchase was made, then the second item may be an item that the user is unlikely to purchase. Accordingly, the electronic apparatus according to example embodiments may assign a lower priority to the second item, and may consider the second item as a lower priority in the sort order.

The item list management method according to example embodiments may provide the items included in the first sub-list to the user in the order of items having a high priority. For example, an item having a high priority among items included in the first sub-list may be exposed on the top, and an item having a lower priority may be exposed below.

Meanwhile, in operation S701, if a specific item does not meet the storage condition in the first sub-list, the electronic apparatus according to example embodiments may perform one of operation S703 of moving the item to the second sub-list and operation S704 of checking the sort order of the item in the second sub-list.

In operation S703, the item that does not satisfy the storage condition in the first sub-list of the item is moved to the second sub-list.

In operation S704, the sort order of the item in the second sub-list is checked. The item list management method according to example embodiments may check the priority of items included in the second sub-list in the same or similar operation to operation S702, and may check the sort order of the items according to the checked priority.

The item list management method according to example embodiments may promote the purchase intention by conspicuously displaying the item the user wants to purchase due to this operation or configuration, and at the same time, the user can easily organize the item the user does not want to purchase.

Figure 8:
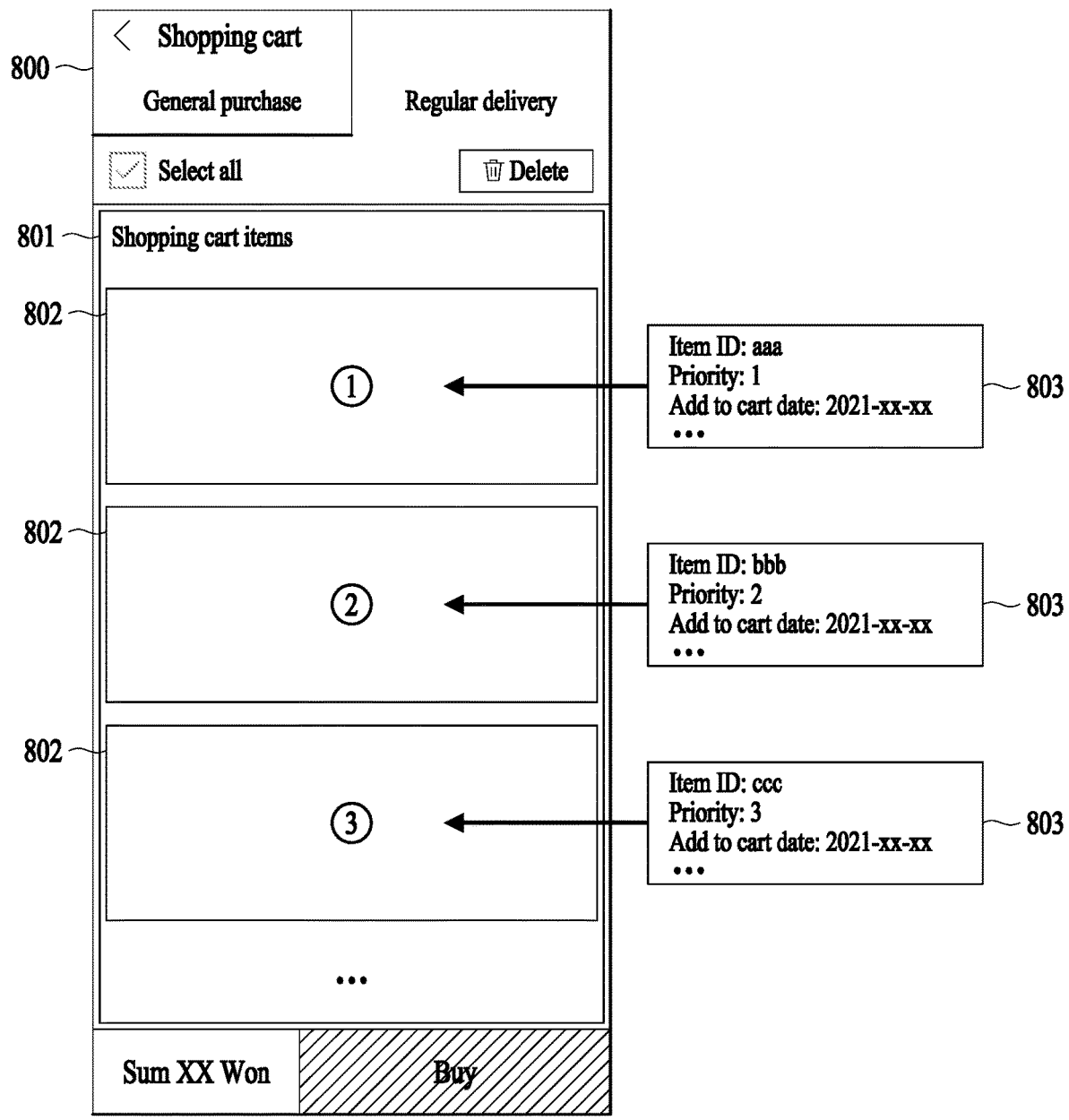
FIG. 8 illustrates an example of a sorting operation of items in a first sub-list according to example embodiments.

FIG. 8 illustrates an example of a sorting operation of items in a first sub-list according to example embodiments.

Some or all operations described in FIG. 8 may be performed in at least one of operations S701 and S702 of FIG. 7.

FIG. 8 illustrates a first page 800 according to example embodiments. The first page 800 may refer to the first page described with reference to FIGS. 2 to 7. The first page may be called a shopping cart page or the like.

The first page 800 may include a first area 801 including items included in the first sub-list. The first area may include at least one of the first area 301 of FIG. 3, the fifth and sixth areas 401a and 401b of FIG. 4, the first area 500 of FIG. 5, and the first area of FIG. 6.

The first area 801 may include an item description area 802 for displaying all or some of the items included in the first sub-list (item description area). The item description area 802 may include the item description area (item description area) 301a of FIG. 3.

The item description area 802 may include information about one item included in the first sub-list. The information about the item may include, for example, an image or video representing the item, name of the item, and price of the item.

Here, the item list management method according to example embodiments may store the items included in the first sub-list together with additional information 803 for each item. The additional information 803 about the items may include, for example, at least one of an item ID for identifying each item, priority information indicating the priority of each item, information indicating the date when each item was added to the first sub-list, and the number of times a purchase attempt has been made by a corresponding user for each item.

The electronic apparatus according to example embodiments may determine the priority of the corresponding item by using the additional information 803 for each item, and decide the order in which the corresponding item is arranged in the first area 801 in the first page 800. The item list management method according to example embodiments may arrange the items in the shopping cart in the order in which the priority of the item is high (that is, the value of the priority is low), and place the items in the first area 801 in the order of the high priority.

For example, referring to FIG. 8, an item having an item ID of 'aaa' is the item having a high priority (i.e., a low priority value), so it is disposed at the top of the first area 801. Since the priority of the item having the item ID 'bbb' is lower than the priority of the item having the item ID 'aaa' (that is, the value is large), it is arranged to be positioned lower than the item with the item ID of 'aaa' in the first area 801. Since the priority of the item having the item ID 'ccc' is low, it may be located at the bottom in the first area 801.

Here, the priority information of the item may be an integer value as shown in FIG. 8, but may also be a float type value calculated by a specific formula and a specific prioritization policy or data composed of a string.

The priority information of the item may be determined to be proportional to the period for which the item is kept in the first sub-list, for example. That is, the longer the period kept in the first sub-list, the lower the priority may be calculated. Conversely, items with a shorter period stored in the first sub-list may be calculated to have a higher priority.

The priority information of the item may also be determined in proportion to the number of times the user attempts to purchase, for example. That is, the higher the number of times the user attempts to purchase, the lower the priority may be calculated. Conversely, the lower the number of times the user has attempted to purchase an item, the higher the priority may be calculated.

Figure 9:
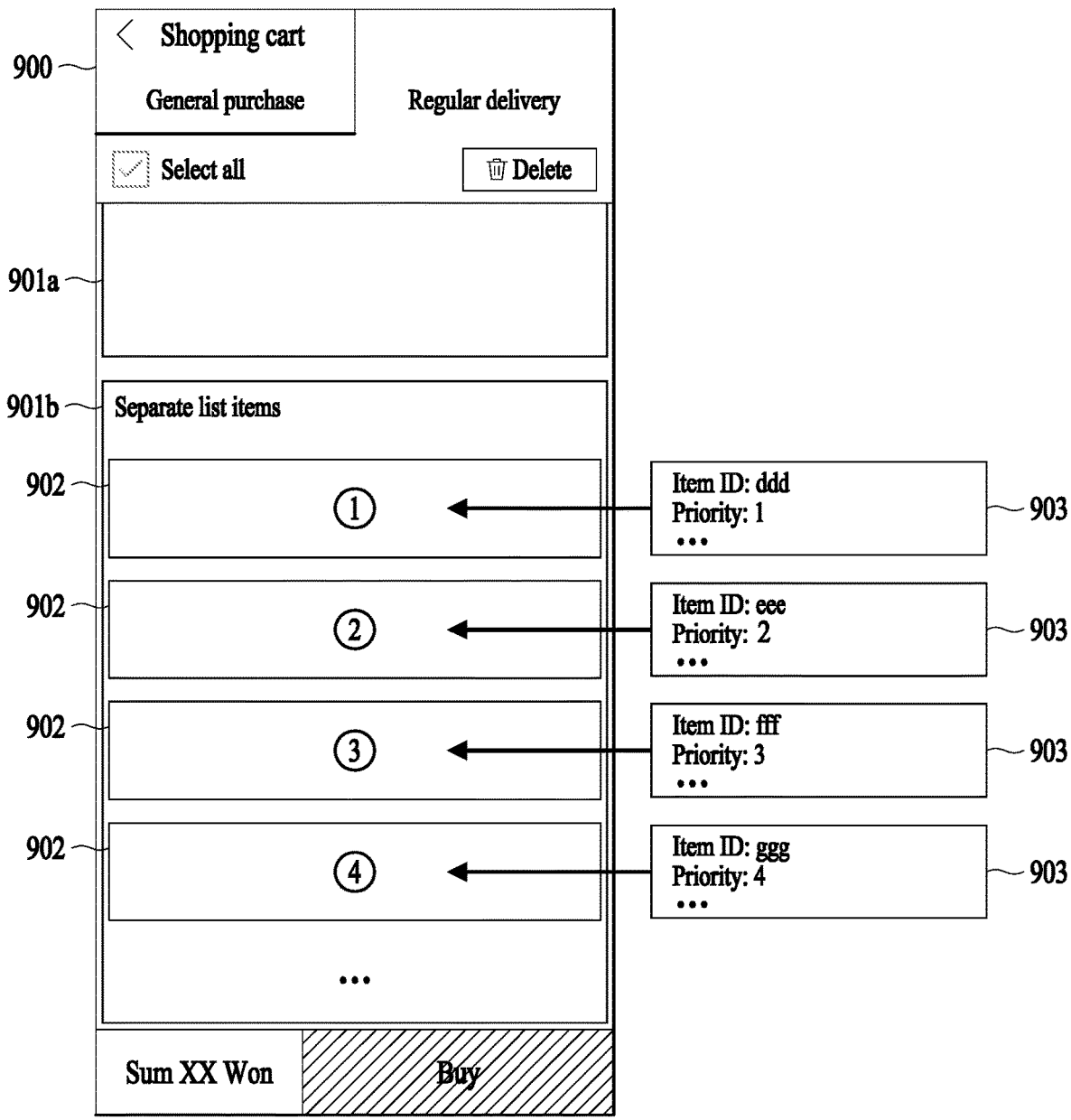
FIG. 9 illustrates an example of a sorting operation of items in a second sub-list according to example embodiments.

FIG. 9 illustrates an example of a sorting operation of items in a second sub-list according to example embodiments.

Some or all operations described in FIG. 9 may be performed in at least one of operations S703 and S704 of FIG. 7.

FIG. 9 illustrates a first page 900 according to example embodiments. The first page 900 may refer to the first page described with reference to FIGS. 2 to 8. The first page may be called a shopping cart page or the like.

The first page 900 may include a first area 901a including items included in the first sub-list. Furthermore, the first page 900 may include a second area 901b including items included in the second sub-list. The second area 901b may include at least one of the second area 302 of FIG. 3 and the second area 600 of FIG. 6.

The second area 901b may include an item description area 902 for displaying all or some of the items included in the second sub-list (item description area). The item description area 902 may include the item description area (item description area) 301a of FIG. 3.

The item description area 902 may include information about one item included in the second sub-list. The information about the item may include, for example, an image or video representing the item, name of the item, and price of the item. The item description area 902 may include a first interface for moving a specific item from the second sub-list to the first sub-list. The first interface may be, for example, the first interface 302b of FIG. 3.

Here, the item list management method according to example embodiments may store the items included in the second sub-list together with additional information 903 for each item. The additional information 903 about the items may include, for example, at least one of an item ID for identifying each item, priority information indicating the priority of each item, information indicating the date when each item was added to the second sub-list, and the number of times a purchase attempt has been made by a corresponding user for each item.

The electronic apparatus according to example embodiments may determine the priority of the corresponding item by using the additional information 903 for each item, and decide the order in which the corresponding item is arranged in the second area 901b in the first page 900. The item list management method according to example embodiments may arrange the items in the shopping cart in the order in which the priority of the item is high (that is, the value of the priority is low), and place the items in the second area 901b in the order of the high priority.

For example, referring to FIG. 9, an item having an item ID of 'ddd' is the item having a high priority (i.e., a low priority value), so it is disposed at the top of the second area 901b. Since the priority of the item having the item ID 'eee' is lower than the priority of the item having the item ID 'ddd' (that is, the value is large), it is arranged to be positioned lower than the item with the item ID of 'ddd' in the second area 901b. Since the priority of the item having the item ID 'ggg' is low, it may be located at the bottom in the second area 901b.

Here, the priority information of the item may be an integer value as shown in FIG. 9, but may also be a float type value calculated by a specific formula and a specific prioritization policy or data composed of a string. The priority information of the item may be determined to be proportional to the period for which the item is kept in the second sub-list, for example. That is, the longer the period kept in the second sub-list, the lower the priority may be calculated. Conversely, items with a shorter period stored in the second sub-list may be calculated to have a higher priority. The priority information of the item may also be determined in proportion to the number of times the user attempts to purchase, for example. That is, the higher the number of times the user attempts to purchase, the lower the priority may be calculated. Conversely, the lower the number of times the user has attempted to purchase an item, the higher the priority may be calculated.

Figure 10:
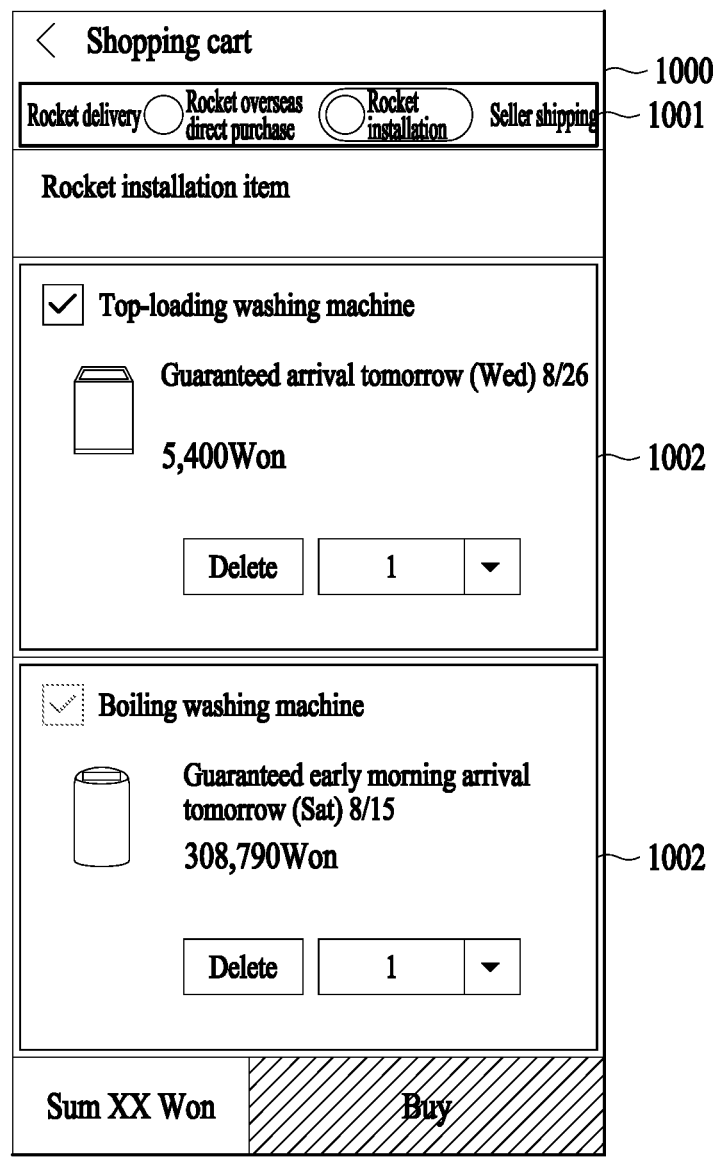
FIG. 10 illustrates an example of a shopping cart page configured to classify items in a first list by category according to example embodiments.

FIG. 10 illustrates an example of a shopping cart page configured to classify items in a first list by category according to example embodiments.

FIG. 10 illustrates a first page 1000 according to example embodiments. The first page 1000 according to example embodiments shown in FIG. 10 may refer to the first page described with reference to FIGS. 2 to 9. The first page may be referred to as a shopping cart page 1000 or the like.

The first page 1000 according to example embodiments may display item(s) in the first sub-list or the second sub-list according to example embodiments by category. The first page 1000 may display, for example, at least one item corresponding to the same category in the same area.

The first page 1000 according to example embodiments may include a sixth area 1002 displaying information on items corresponding to a specific category among the first sub-list or the second sub-list according to example embodiments.

The first page 1000 according to example embodiments may further include an eleventh interface 1001 for filtering categories of items according to example embodiments. For example, when the user selects a first category (e.g., a rocket installation category) in the eleventh interface 1001, the first page 1000 according to example embodiments may display item(s) corresponding to the first category within the first sub-list or the second sub-list in the sixth area 1002 according to example embodiments.

The eleventh interface 1001 according to example embodiments may select a plurality of categories. For example, when a user selects a first category and a second category (e.g., a rocket overseas direct purchase category) in the eleventh interface 1001, the first page 1000 according to example embodiments may display item(s) corresponding to the first category or the second category in the first sub-list or the second sub-list in the sixth area 1002 according to example embodiments.

Figure 11:
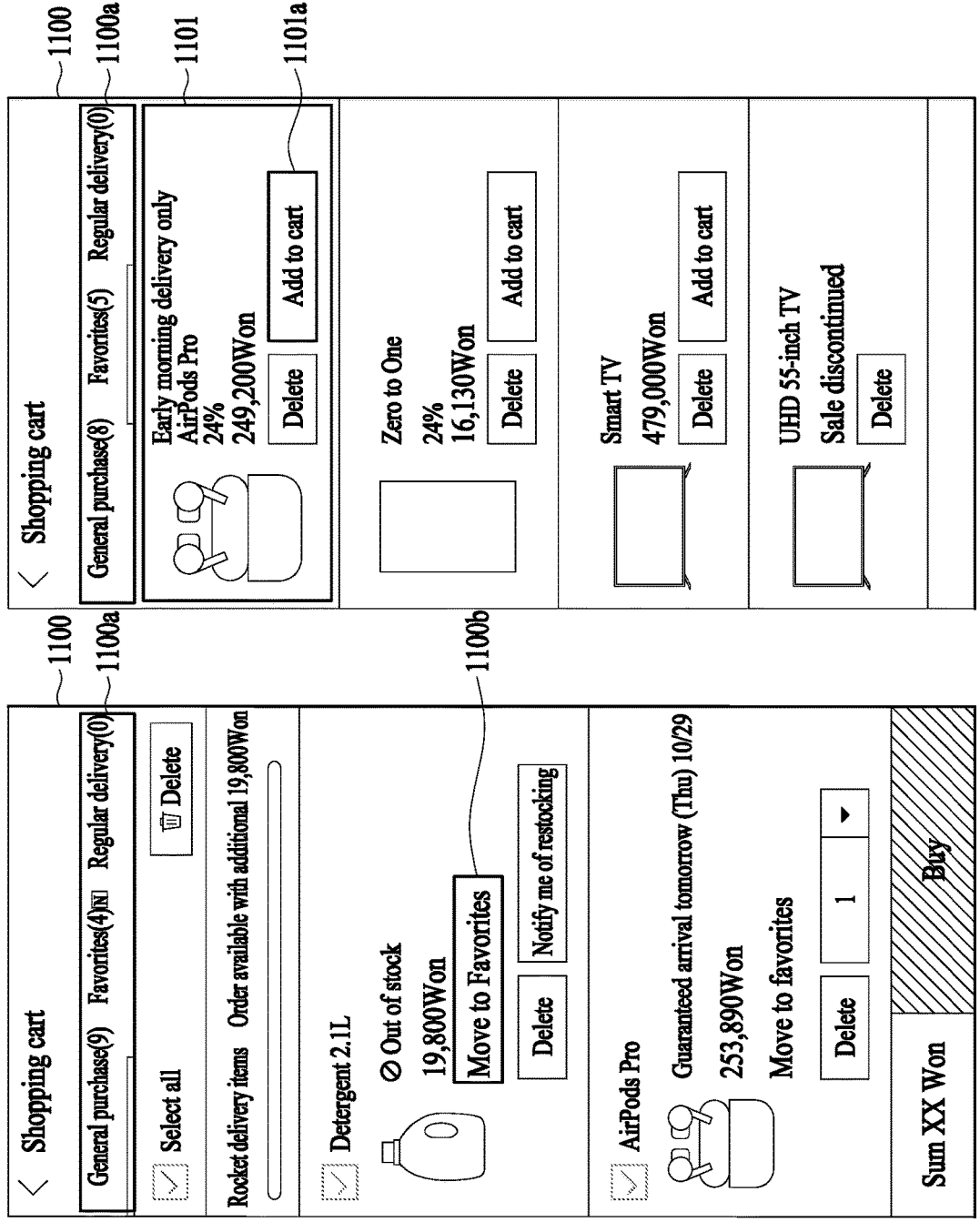
FIG. 11 illustrates an example of a shopping cart sub-list and a favorite items list according to example embodiments.

FIG. 11 illustrates an example of a shopping cart sub-list and a favorite items list according to example embodiments.

A left portion of FIG. 11 represents a first page 1100 according to example embodiments. The first page 1100 shown in the left portion of FIG. 11 may refer to the first page described with reference to FIGS. 2 to 10. The first page may be referred to as a shopping cart page 1100 or the like.

Meanwhile, the electronic apparatus according to example embodiments may store a third sub-list for temporarily storing items of interest to the user. The electronic apparatus according to example embodiments may add or delete an item to or from the third sub-list based on a user input.

The electronic apparatus according to example embodiments may be used for operations for inducing a user to purchase items of interest. For example, the electronic apparatus according to example embodiments may identify items of interest to the user by using the third sub-list, and recommend other items that the user may be interested in based on the information about them. Also, for example, when the user purchases items included in the shopping cart list (the first sub-list), the electronic apparatus according to example embodiments may present information on the items displayed in the third sub-list before payment. Also, for example, the electronic apparatus according to example embodiments may analyze a user's purchasing tendency and an item preferred by the user with respect to a specific item category based on information on items included in the third sub-list. For example, the electronic apparatus according to example embodiments compares and analyzes the third sub-list of the corresponding user with the third sub-lists of other users, identifies other users having similar purchasing propensity to the corresponding user (e.g., when there are many duplicated items included in the third sub-list), and may recommend items added by other users to the third sub-list to the corresponding user.

The third sub-list according to example embodiments may be called a favorite item list, a favorite product list, a favorites list, a wish list, and the like.

The first page 1100 according to example embodiments may include a twelfth interface 1100a for driving a first mode displaying items included in the first sub-list (shopping cart sub-list) and a second mode displaying items included in the third sub-list (favorite items list) to appear in a specific area of the first page 1100. For example, when the user clicks on an area marked 'General purchase' in the twelfth interface 1100a, the electronic apparatus according to example embodiments may display information on items included in the first sub-list in a specific area (e.g., the first area 300 of FIG. 3, the first area 500 displaying items included in the first sub-list of FIG. 5, etc.) in the first page 1100 based on the first mode. For example, when the user clicks on an area marked 'Favorites' in the twelfth interface 1100a, the electronic apparatus according to example embodiments may display information on items included in the third sub-list in a specific area of the first page 1100 based on the second mode.

The left portion of FIG. 11 shows an example of the first page in which the item list management method according to example embodiments displays item(s) included in the first sub-list based on the first mode described above.

The first page 1100 according to example embodiments may include a thirteenth interface 1100b for moving a specific item to the third sub-list for each item included in the first sub-list. For example, when the user clicks on the thirteenth interface 1100b corresponding to a specific item, the corresponding item may move from the first sub-list to the third sub-list.

A right portion of FIG. 11 shows an example of the first page in which the item list management method according to example embodiments displays item(s) included in the third sub-list based on the second mode described above. Meanwhile, the item list management method according to example embodiments may provide a separate third page displaying item(s) included in the third sub-list to the user based on the second mode. That is, the third page according to example embodiments may display item(s) included in the third sub-list according to example embodiments. The third page may be called a favorites page, a wish list page, a temporary storage page, and the like.

Based on the second mode, the first page 1100 or the third page according to example embodiments may include a fourth area 1101 displaying information on items included in the third sub-list. The fourth area 1101 may include, for example, an image or video representing the corresponding item, name of the corresponding item, information related to delivery of the corresponding item, price of the corresponding item, and information related to a discount applied to the corresponding item. The fourth area 1101 may further include a fourteenth interface for deleting the corresponding item from the third sub-list.

The fourth area 1101 may further include a fifteenth interface 1101a for moving the corresponding item from the third sub-list to the first sub-list. For example, when the user clicks on the fifteenth interface 1101a, the corresponding item may move from the third sub-list to the first sub-list.

Example embodiments of the present disclosure have been disclosed in the present specification and drawings. Although specific terms are used, these are only used in general meaning to easily explain the technical content of the present disclosure and to aid understanding of the present disclosure, but not intended to limit the scope of the present disclosure. It is obvious to those skilled in the art that other modified examples based on the technical idea of the present disclosure can be implemented in addition to the example embodiments disclosed herein.

The electronic apparatus or terminal according to the above-described example embodiments may include a processor, a memory for storing and executing program data, a permanent storage such as a disk drive, a communication port for communicating with an external device, a user interface device such as a touch panel, a key, a button, or the like. Methods implemented as software modules or algorithms may be stored on a computer-readable recording medium as computer-readable codes or program instructions executable on the processor. Here, the computer-readable recording medium includes a magnetic storage medium (e.g., ROM (read-only memory), RAM (random-Access memory), floppy disk, hard disk, etc.) and optical reading medium (e.g., CD-ROM and DVD (Digital Versatile Disc)). The computer-readable recording medium is distributed over networked computer systems, so that computer-readable codes can be stored and executed in a distributed manner. The medium is readable by a computer, stored in a memory, and executed on a processor.

The present example embodiment can be represented by functional block configurations and various processing steps. These functional blocks may be implemented with various numbers of hardware or/and software configurations that perform specific functions. For example, the example embodiment may employ an integrated circuit configuration such as memory, processing, logic, look-up table, or the like, capable of executing various functions by control of one or more microprocessors or other control devices. Similar to that components can be implemented with software programming or software elements, this example embodiment includes various algorithms implemented with a combination of data structures, processes, routines or other programming components and may be implemented with a programming or scripting language including C, C++, JAVA® of ORACLE AMERICA, INC., assembler, etc. Functional aspects can be implemented with an algorithm running on one or more processors. In addition, the present example embodiment may employ a conventional technique for at least one of electronic environment setting, signal processing, and data processing. Terms such as "mechanism", "element", "means", and "composition" can be used in a broad sense, and are not limited to mechanical and physical configurations. Those terms may include the meaning of a series of routines of software in connection with a processor or the like.

The above-described example embodiments are merely examples, and other embodiments may be implemented within the scope of the claims to be described later.

Example embodiments of the present disclosure have been disclosed in the present specification and drawings. Although specific terms are used, these are only used in general meaning to easily explain the technical content of the present disclosure and to aid understanding of the present disclosure, but not intended to limit the scope of the present disclosure. It is obvious to those skilled in the art that other modified examples based on the technical idea of the present disclosure can be implemented in addition to the example embodiments disclosed herein.

What is claimed is:

1. A method of managing an item list by an electronic apparatus, the method comprising:
receiving, from a user, a selection input, wherein the selection input identifies a first item;

classifying, based on receiving the selection input, the first item in a first sub-list of the item list;

storing, based on classifying the first item in the first sub-list, a time when the first item was stored in the item list;

determining, based on the time when the first item was stored in the item list, whether a period of time after which the first item has been stored in the item list is longer than a specific period of time;

additionally classifying, based on a determination that the period of time is longer than the specific period of time, the first item in a second sub-list;

deleting, based on the determination that the period of time is longer than the specific period of time and based on classifying the first item into a second sub-list, the first item from the first sub-list; and providing, in response to a first input of the user, a first page including the first sub-list displayed in a first area and the second sub-list displayed in a second area distinct from the first area.

2. The method of claim 1,
wherein the first sub-list includes a first image corresponding to at least one item included in the first sub-list,
wherein the second sub-list includes a second image corresponding to the first item included in the second sub-list, and
wherein the first image is displayed, in the first page, larger than the second image.

3. The method of claim 2,
wherein the second sub-list includes a fifth area displaying information on the first item included in the second sub-list, and
wherein the fifth area includes a fourth icon for moving, f-based on an input based on a gesture of the user, the first item to the first sub-list.

4. The method of claim 1, wherein the first page includes information related to a purchase condition based on at least one item included in the first sub-list displayed in a third area distinct from the first area.

5. The method of claim 1,
wherein the second sub-list includes a first interface corresponding to each item, including the first item, included in the second sub-list, and
wherein, according to a second input of the user corresponding to the first interface, the first item related to the first interface is moved to the first sub-list.

6. The method of claim 1,
wherein the first area is located above the second area in the first page, and
wherein the first area is displayed at a position that can be exposed without scrolling on a terminal of the user.

7. The method of claim 1,
wherein the first area is larger than the second area, and
wherein in response to an input of entire selection related to the item list, items included in the first sub-list are selected, and selection of items included in the second sub-list is omitted.

8. The method of claim 1,
wherein the first sub-list comprises at least two items, the method further comprising:
determining a display order of the at least two items in the first sub-list.

9. The method of claim 8, wherein the display order of the at least two items is determined based on a number of attempts to purchase an individual item of the at least two items and a period in which the individual item is stored in the first sub-list.

10. The method of claim 1, further comprising:
providing a second page for managing at least one item included in the first sub-list and the second sub-list.

11. The method of claim 10, wherein the second page displays the at least one item based on a period in which the at least one item was stored in the first sub-list.

12. The method of claim 10, wherein the second page includes a check box for the user to select whether or not to delete the at least one item from the first sub-list.

13. The method of claim 12, wherein when the at least one item has been stored in the first sub-list for a specific period or longer, the check box for the item in the second page is displayed as checked as a default.

14. The method of claim 1,
wherein the first sub-list includes a second interface corresponding to each item included in the first sub-list, and
wherein, according to a second input of the user corresponding to the second interface, an item related to the second interface is moved from the first sub-list to a third sub-list.

15. The method of claim 14, further comprising:
providing a third page for managing the item included in the third sub-list,
wherein the third page includes a fourth area for displaying the third sub-list,
wherein the second sub-list includes a third icon corresponding to each item included in the second sub-list, and
wherein, according to a third input of the user corresponding to the third icon, an item related to the third icon is moved to the first sub-list.

16. The method of claim 1, wherein the first area displays items in the first sub-list sorted by category.

17. The method of claim 16, wherein the first area displays, according to an input of the user corresponding to a specific category, an item corresponding to the specific category in the first sub-list.

18. The method of claim 1, further comprising:
classifying, based on a determination that the number of times the user attempted to purchase a second item stored in the first sub-list satisfies a threshold, the second item in the second sub-list; and
deleting, based on the determination that the number of times the user attempted to purchase the second item stored in the first sub-list satisfies a threshold, the second item from the first sub-list.

19. The method of claim 1, further comprising:
determining, among items in the first sub-list, a priority of the first item; and
sorting, based on the additionally classifying the first item in the second sub-list and based on the priority, items classified in the second sub-list.

20. The method of claim 1, further comprising:
sorting, based on the additionally classifying the first item in the second sub-list and based on a number of times the user attempted to purchase the first item while the first item was stored in the first sub-list, items classified in the second sub-list.

21. An electronic apparatus for managing a landing page, the electronic apparatus comprising:
a memory having at least one program stored therein; and
a processor configured to execute the at least one program to:

receive, from a user, a selection input, wherein the selection input identifies a first item;
classify, based on receiving the selection input, the first item in a first sub-list of an item list;
store, based on classifying the first item in the first sub-list, a time when the first item was stored in the item list;
determine, based on the time when the first item was stored in the item list, whether a period of time after which the first item has been stored in the item list is longer than a specific period of time;
classify, based on a determination that the period of time is longer than the specific period of time, the first item into a second sub-list;
delete, based on the determination that the period of time is longer than the specific period of time and based on classifying the first item into a second sub-list, the first item from the first sub-list; and
provide, in response to a first input of the user, a first page including the first sub-list displayed in a first area and the second sub-list displayed in a second area distinct from the first area.

22. A non-transitory computer-readable storage medium comprising:
a medium configured to store computer-readable instructions, wherein when the computer-readable instructions are executed by a processor, the processor is configured to:
receive, from a user, a selection input, wherein the selection input identifies a first item;
classify, based on receiving the selection input, the first item in a first sub-list of an item list;
store, based on classifying the first item in a first sub-list, a time when the first item was stored in the item list;
determine, based on the time when the first item was stored in the item list, whether a period of time after which the first item has been stored in the item list is longer than a specific period of time;
additionally classify, based on a determination that the period of time is longer than the specific period of time, the first item in a second sub-list;
delete, based on the determination that the period of time is longer than the specific period of time and based on classifying the first item into a second sub-list, the first item from the first sub-list; and
provide, in response to a first input of the user, a first page including the first sub-list displayed in a first area and the second sub-list displayed in a second area distinct from the first area.

* * * * *